United States Patent
Adachi et al.

(10) Patent No.: US 10,480,967 B2
(45) Date of Patent: Nov. 19, 2019

(54) SIGNAL PROCESSING DEVICE AND SIGNAL PROCESSING METHOD

(71) Applicant: Sharp Kabushiki Kaisha, Sakai, Osaka (JP)

(72) Inventors: Yoshihisa Adachi, Sakai (JP); Tetsuya Okumura, Sakai (JP); Tetsuya Hayashi, Sakai (JP); Shigemi Maeda, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 371 days.

(21) Appl. No.: 15/526,014

(22) PCT Filed: Nov. 5, 2015

(86) PCT No.: PCT/JP2015/081182
§ 371 (c)(1),
(2) Date: May 11, 2017

(87) PCT Pub. No.: WO2016/076200
PCT Pub. Date: May 19, 2016

(65) Prior Publication Data
US 2017/0322057 A1 Nov. 9, 2017

(30) Foreign Application Priority Data
Nov. 14, 2014 (JP) .................. 2014-232094

(51) Int. Cl.
*G01D 21/00* (2006.01)
*G01K 7/00* (2006.01)
*G01K 7/42* (2006.01)

(52) U.S. Cl.
CPC .............. *G01D 21/00* (2013.01); *G01K 7/00* (2013.01); *G01K 7/42* (2013.01)

(58) Field of Classification Search
CPC ............. G01D 21/00; G01K 7/42; G01K 7/00
(Continued)

(56) References Cited

U.S. PATENT DOCUMENTS 4,541,734 A * 9/1985 Ishizaka ................ G01K 7/42
374/169
8,058,831 B2 * 11/2011 Ishikawa ................ B41J 19/202
318/484

(Continued)

FOREIGN PATENT DOCUMENTS

| JP | 2001-041824 A | 2/2001 |
|----|---------------|--------|
| JP | 2005-216202 A | 8/2005 |
| WO | 2006/090634 A1 | 8/2006 |

*Primary Examiner* — John E Breene
*Assistant Examiner* — Jeffrey P Aiello
(74) *Attorney, Agent, or Firm* — ScienBiziP, P.C.

(57) ABSTRACT

A signal processing device (100) includes a prediction circuit (20) configured to generate $V_{b\_T2}$ corresponding to an output signal to be obtained at T2 after T1, in accordance with $V_{a\_T1}$ obtained at the time T1, in a transition response period before Tr or Td elapses, where Tr denotes a time period during which an output signal $V_{a(T)}$ of a sensor (80) changes from a converged value $V_c1$ corresponding to a parameter P1 representing a certain property of an object to be measured to a converged value $V_c2$ corresponding to P2, and Td denotes a time period during which $V_{a(T)}$ changes from $V_c2$ to $V_c1$. The prediction circuit generates the predicted value so that TrE<Tr, TdE<Td, |1−Td/Tr|>|1−TdE/TrE| are satisfied, where TrE denotes a time period during which the predicted value becomes a value corresponding to $V_c2$, and TdE denotes a time period during which the predicted value becomes a value corresponding to $V_c1$.

11 Claims, 8 Drawing Sheets

(58) Field of Classification Search
USPC .................................................. 702/104, 182
See application file for complete search history.

(56) References Cited

U.S. PATENT DOCUMENTS

| | | | | |
|---|---|---|---|---|
| 8,249,616 B2* | 8/2012 | Boejer | .................... | G01S 19/09 |
| | | | | 455/456.1 |
| 8,770,759 B2* | 7/2014 | Liu | ........................ | G03B 33/08 |
| | | | | 349/13 |
| 8,862,248 B2* | 10/2014 | Yasui | .................... | G05B 13/042 |
| | | | | 477/107 |
| 9,002,672 B2* | 4/2015 | Riendeau | ................ | G01M 5/00 |
| | | | | 702/89 |
| 9,162,445 B2* | 10/2015 | Miyasaka | .............. | B41J 2/0456 |

* cited by examiner

SIGNAL PROCESSING DEVICE AND SIGNAL PROCESSING METHOD

TECHNICAL FIELD

The present invention relates to a signal processing device, a signal processing method, and a computer program, and in particular, relates to a signal processing device, a signal processing method, and a computer program with which it is possible to evaluate an estimated value on the basis of an output signal from a sensor.

BACKGROUND ART

For example, of various types of sensors using a semiconductor such as a gas sensor, a humidity sensor, and a temperature sensor, there are some sensors which require a relatively long time period from a start of measurement until a value of the output signal (for example, a voltage value) is converged. That is, when a certain property of an object to be measured is evaluated on the basis of an output signal from a sensor, it is not possible to evaluate the property until a value of the output signal is converged.

Note that as used herein, "the value of the output signal is converged" means that a difference between a value of the output signal at a certain time after a sufficient time period elapses and a value of the output signal at a time before the certain time, is a value, during a prescribed time period, within a prescribed range, and the converged value of the output signal is referred to as "converged value". Further, a time period from a start of measurement until the value of the output signal is converged is referred to as "response time period", and a period until the response time period elapses is referred to as "transition response period".

In order to quickly evaluate a certain property of an object to be measured on the basis of the output signal from the sensor, the converged value corresponding to the property may be estimated on the basis of the value of the output signal in the transition response period. Various methods of estimating such a converged value are studied. For example, PTL 1 discloses a method of estimating the converged value (final response value) for a radiation detector on the basis of an initial or middle dosage rate or count rate of a transition response period.

CITATION LIST

Patent Literature

PTL 1: WO 2006/090634

SUMMARY OF INVENTION

Technical Problem

However, a sensor (including various types of detectors) often differs in response characteristic at a rising and at a falling. Here, the rising refers to a case where a value of an output signal of a sensor increases and the falling refers to a case where the value of the output value of the sensor decreases, where Tr denotes a rising response time period and Td denotes a falling response time period.

In the estimating method described in PTL 1, the same time constant (T) is used for each of the rising response and the falling response, and when the sensor response time period differs between the rising response and the falling response, it is difficult to accurately evaluate the converged value for both the rising response and the falling response.

Further, when an independent response time period is used for each of the rising response and the falling response, it is possible to accurately evaluate the respective converged values; however, a time period during which the converged value is obtained will differ between the rising response and the falling response. If so, a timing to advance to a next process in which the respective converged values are used during the rising response and during the falling response will differ, leading to a problem that the next process is complicated.

The present invention has been achieved to overcome the above problem, and an object thereof is to provide a signal processing device, a signal processing method, and a computer program with which it is possible to easily carry out processes where a predicted value is used which is based on an output signal from a sensor with differing rising response time period and falling response time period.

Solution to Problem

A signal processing device according to an embodiment of the present invention includes: an input interface configured to receive an output signal $V_{a(T)}$ from a sensor; and a prediction unit configured to generate, in accordance with a value $V_{a\_T1}$ of an output signal obtained at a time T1, in a transition response period before a response time period Tr or Td elapses, a predicted value $V_{b\_T2}$ corresponding to a value of the output signal to be obtained at a time T2 after the time T1, where Tr denotes a response time period during which the value of the output signal $V_{a(T)}$ changes from a first converged value $V_c1$ corresponding to a first value P1 of a parameter representing a certain property of an object to be measured to a second converged value $V_c2$ corresponding to a second value P2 different from the first value P1 of the parameter representing the certain property of the object to be measured, and Td denotes a response time period during which the value of the output signal $V_{a(T)}$ changes from the second converged value $V_c2$ to the first converged value $V_c1$. The prediction unit generates the predicted value so that TrE<Tr, TdE<Td, |1−Td/Tr|>|1−TdE/TrE| are satisfied, where TrE denotes a response time period during which the predicted value becomes a value corresponding to the second converged value $V_c2$, and TdE denotes a response time period during which the predicted value becomes a value corresponding to the first converged value $V_c1$.

In a certain embodiment, the prediction unit generates, when a value of the output signal $V_{a(T)}$ is the first converged value $V_c1$ for a time period longer than the response time period Tr or Td, a predicted value closer to the first converged value $V_c1$, and generates, when the value is the second converged value $V_c2$ for a time period longer than the response time period Tr or Td, a predicted value closer to the second converged value $V_c2$.

In a certain embodiment, the prediction unit includes a prediction unit corresponding to each of a rising and a falling of the output signal $V_{a(T)}$.

In a certain embodiment, the prediction unit includes a memory configured to store therein a parameter corresponding to each of a rising and a falling of the output signal $V_{a(T)}$.

In a certain embodiment, the signal processing device may further include a display device configured to display the predicted value.

In a certain embodiment, the signal processing device further includes an information generation unit configured to generate information on the basis of the predicted value generated by the prediction unit.

In a certain embodiment, the signal processing device may further include a display device configured to display the information.

In a certain embodiment, the signal processing device includes: a client terminal and a server device connected to each other via a network. The client terminal includes at least the input interface and a communication unit.

In a certain embodiment, the signal processing device may further include the sensor.

A signal processing method according to an embodiment of the present invention includes: receiving an output signal $V_{a(T)}$ from a sensor; and generating, in accordance with a value $V_{a\_T1}$ of an output signal obtained at a time T1, in a transition response period before a response time period Tr or Td elapses, a predicted value $V_{b\_T2}$ corresponding to a value of an output signal to be obtained at a time T2 after the time T1, where Tr denotes a response time period during which the value of the output signal $V_{a(T)}$ changes from a first converged value $V_c1$ corresponding to a first value P1 of a parameter representing a certain property of an object to be measured to a second converged value $V_c2$ corresponding to a second value P2 different from the first value P1 of the parameter representing the certain property of the object to be measured, and Td denotes a response time period during which the value of the output signal $V_{a(T)}$ changes from the second converged value $V_c2$ to the first converged value $V_c1$. The predicted value is generated so that TrE<Tr, TdE<Td, |1−Td/Tr|>|1−TdE/TrE| are satisfied, where TrE denotes a response time period during which the predicted value becomes a value corresponding to the second converged value $V_c2$ and TdE denotes a response time period during which the predicted value becomes a value corresponding to the first converged value $V_c2$.

A program according to an embodiment of the present invention causes a computer to: receive an output signal $V_{a(T)}$ from a sensor; and generate, in accordance with a value $V_{a\_T1}$ of an output signal obtained at a time T1, in a transition response period before a response time period Tr or Td elapses, a predicted value $V_{b\_T2}$ corresponding to a value of the output signal to be obtained at a time T2 after the time T1, where Tr denotes a response time period during which the value of the output signal $V_{a(T)}$ changes from a first converged value $V_c1$ corresponding to a first value P1 of a parameter representing a certain property of an object to be measured to a second converged value $V_c2$ corresponding to a second value P2 different from the first value P1 of the parameter representing the certain property of the object to be measured and Td denotes a response time period during which the value of the output signal $V_{a(T)}$ changes from the second converged value $V_c2$ to the first converged value $V_c1$. The predicted value is generated so that TrE<Tr, TdE<Td, |1−Td/Tr|>|1−TdE/TrE| are satisfied, where TrE denotes a response time period during which the predicted value becomes a value corresponding to the second converged value $V_c2$, and TdE denotes a response time period during which the predicted value becomes a value corresponding to the first converged value $V_c1$.

Advantageous Effects of Invention

According to an embodiment of the present invention, it is possible to provide a signal processing device, a signal processing method, and a computer program with which it is possible to easily carry out processes where a predicted value is used which is based on an output signal from a sensor with differing rising response time period and falling response time period.

BRIEF DESCRIPTION OF DRAWINGS

FIG. 1A is a diagram schematically illustrating a time change of a property of an object to be measured, FIG. 1B is a diagram schematically illustrating a time change of an output signal of a sensor, and FIG. 1C is a diagram schematically illustrating a time change of a predicted value generated by a signal processing device or a signal processing method according to an embodiment.

DESCRIPTION OF EMBODIMENTS

Figure 1A:
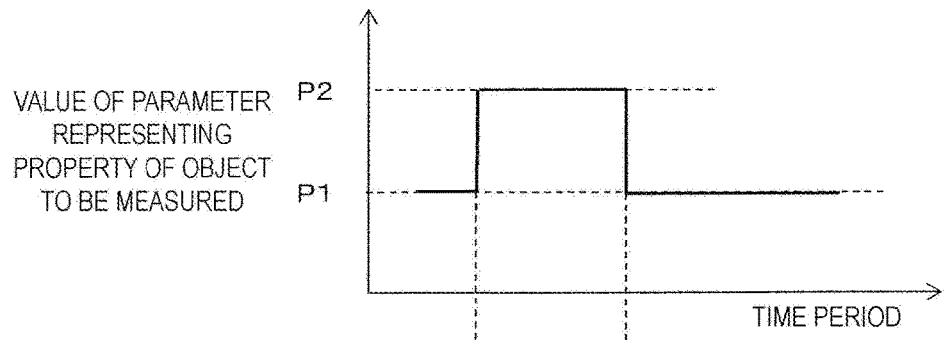
FIGS. 1A to 1C are diagrams for describing a relationship between a predicted value generated by a signal processing device or a signal processing method according to an embodiment of the present invention and an output signal of a sensor, where

With reference to drawings, a signal processing device, a signal processing method, and a computer program will be described below.

A signal processing device according to an embodiment of the present invention includes: an input interface configured to receive an output signal $V_{a(T)}$ from a sensor: and a prediction circuit (prediction unit) configured to generate, in accordance with a value $V_{a\_T1}$ of an output signal obtained at a time T1, in a transition response period before a response time period Tr or Td elapses, a predicted value $V_{b\_T2}$ corresponding to a value of an output signal to be obtained at a time T2 after the time T1, where Tr denotes a response time period during which the value of the output signal $V_{a(T)}$ changes from a first converged value $V_c1$ corresponding to a first value P1 of a parameter representing a certain property of an object to be measured to a second converged value $V_c2$ corresponding to a second value P2 different from the first value P1 of a parameter representing the certain property of the object to be measured, and Td denotes a response time period during which the value of the output signal $V_{a(T)}$ changes from the second converged value $V_c2$ to the first converged value $V_c1$. The prediction circuit generates the predicted value so that TrE<Tr, TdE<Td, |1−Td/Tr|>|1−TdE/TrE| are satisfied, where TrE denotes a response time period during which the predicted value becomes a value corresponding to the second converged value $V_c2$, and TdE denotes a response time period during which the predicted value becomes a value corresponding to the first converged value $V_c1$. Examples of the property of the object to be measured include a humidity, a temperature, and a gas concentration, and examples of the parameters representing the properties include a relative humidity (RH) of 60%, a temperature of 25° C., and a concentration of 0.1 ppm.

A signal processing method according to an embodiment of the present invention includes: receiving an output signal $V_{a(T)}$ from a sensor; and generating, in accordance with a value $V_{1\_T1}$ of an output signal obtained at a time T1, in a transition response period before a response time period Tr or Td elapses, a predicted value $V_{b\_T2}$ corresponding to a value of an output signal to be obtained at a time T2 after the time T1, where Tr denotes a response time period during which the value of the output signal $V_{a(T)}$ changes from a first converged value $V_c1$ corresponding to a first value P1 of a parameter representing a certain property of an object to be measured to a second converged value $V_c2$ corresponding to a second value P2 different from the first value P1 of a parameter representing the certain property of the object to be measured, and Td denotes a response time period during which the value of the output signal $V_{a(T)}$ changes from the second converged value $V_c2$ to the first converged value $V_c1$. The predicted value is generated so that TrE<Tr, TdE<Td, |1−Td/Tr|>|1−TdE/TrE| are satisfied, where TrE denotes a response time period during which the predicted value becomes a value corresponding to the second converged value $V_c2$, and TdE denotes a response time period during which the predicted value becomes a value corresponding to the first converged value $V_c1$. A signal processing method according to an embodiment of the present invention may be executed by the signal processing device described above, for example.

Further, a computer program according to an embodiment of the present invention is capable of causing a computer to execute the above signal processing method. The computer may be a plurality of computers connected via a network. In other words, the signal processing device may be a computer or a plurality of computers (including, for example, a server device and a client terminal) connected via a network. A program according to an embodiment of the present invention may be stored in a memory of a computer, for example.

When a response characteristic of a sensor is approximated, for example, as a first-order lag phenomenon, it is possible to use, instead of the response time periods Tr, Td, time periods (may be referred to as "63% response time period") $Tr^{63}$, $Td^{63}$ that lasts until a relative 63% value of each converged value is reached. Here, the relative 63% value of the converged value refers to a value of an output signal $V_{a(T)}$ having 63% of a change amount when a whole change amount is 100%. For example, when an output of a sensor changes from a first converged value $V_c1$ to a second converged value $V_c2$, the relative 63% value of the second converged value $V_c2$ is $V_c1+(V_c2−V_c1)\times0.63$, and when the output of a sensor changes from the second converged value $V_c2$ to the first converged value $V_c1$, the relative 63% value of the first converged value $V_c1$ is $V_c2+(V_c1−V_c2)\times0.63$ (note that x denotes multiplication, hereinafter, the same applies). The relative 63% value of the first converged value $V_c1$ is represented as "$V_c1^{63}$", and the relative 63% value of the second converged value $V_c2$ is represented as "$V_c2^{63}$". Further, a response time period during which the predicted value changes from the first converged value $V_c1$ to the relative 63% value $V_c2^{63}$ of the second converged value $V_c2$ is represented as "$TrE^{63}$", and a response time period during which the predicted value changes from the second converged value $V_c2$ to the relative 63% value $V_c1^{63}$ of the first converged value $V_c1$ is represented as "$TdE^{63}$".

Thus, when the response characteristic of a sensor can be approximated as a first-order lag phenomenon, for example, the prediction circuit provided in the signal processing device according to an embodiment of the present invention may be configured to generate a predicted value so that $TrE^{63}<Tr^{63}$, $TdE^{63}<Td^{63}$, $|1−Td^{63}/Tr^{63}|>|1−TdE^{63}/TrE^{63}|$ are satisfied. Further, similar to the above, instead of the 63% response time period, by using a 90% response time period, the prediction circuit may be configured so as to generate a predicted value so that $TrE^{90}<Tr^{90}$, $TdE^{90}<Td^{90}$, $|1−Td^{90}/Tr^{90}|>|1−TdE^{90}/TrE^{90}|$ are satisfied. Naturally, such a prediction circuit is capable of generating a predicted value so that TrE<Tr, TdE<Td, |1−Td/Tr|>|1−TdE/TrE| are satisfied.

Further, the first converged value $V_c1$ and the second converged value $V_c2$ are different values corresponding to a value different in parameter representing a certain property of an object to be measured, and a relationship in amplitude between the first converged value $V_c1$ and the second converged value $V_c2$ is not limited. That is, it may be possible that the first converged value $V_c1$<the second converged value $V_c$, or the first converged value $V_c1$>the second converged value $V_c2$. Note that a case where the first converged value $V_c1$<the second converged value $V_c2$ is mainly illustrated, and a response time period Tr during which when the parameter of the object to be measured by a sensor changes from a first value P1 to a second value P2, a value of an output signal of a sensor changes from the first converged value $V_c1$ corresponding to the first value P1 to the second converged value $V_c2$, is referred to as a rising response time period. Further, on the contrary, a response time period Td during which when the parameter of the object to be measured by a sensor changes from the second value P2 to the first value P1, the value of the output signal of a sensor changes from the second converged value $V_c2$ corresponding to the second value P2 to the first converged value $V_c1$ is referred to as a falling response time period. Naturally, Tr and Td is not limited to this example.

For example, when a sensor is a humidity sensor, a case is considered where a sensor moves from outdoor (a first humidity: a first value P1 of a parameter) to indoor (a second humidity: a second value P2 of the parameter) and again moves to outdoor (the first humidity: the first value P1 of the parameter).

In this case, a value of a property (humidity) of an object to be measured by a sensor changes from P1 to P2 and from P2 to P1, as illustrated in FIG. 1A. The change from P1 to P2 and from P2 to P1 is stepwise.

Figure 1B:
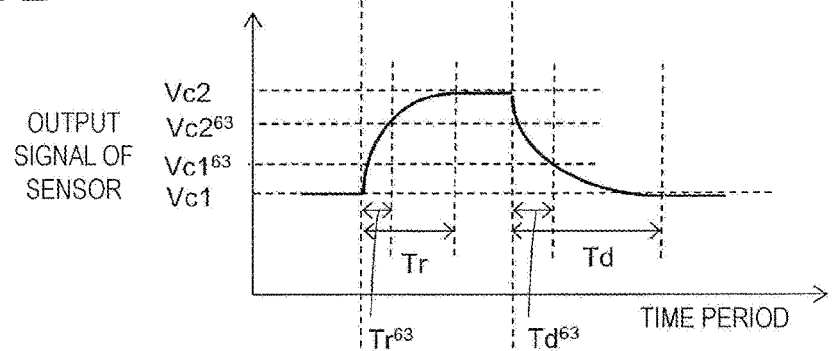

A value of an output signal of a sensor at this time shows a step response characteristic, as illustrated in FIG. 1B, for example. As illustrated here, when the step response characteristic shows step response characteristic of a first-order lag, it is possible to use the 63% response time period instead of the response time period.

Note that a converged value of an output signal $V_{a(T)}$ of a sensor corresponding to P1 is $V_c1$, and a converged value of an output signal $V_{a(T)}$ of a sensor corresponding to P2 is $V_c2$ ($V_c1<V_c2$). At this time, $V_{a(T)}=V_c1+(V_c2-V_c1)\times(1-e^{-T/tr})$ is satisfied, where "tr" denotes a time constant (for rising) of a first-order lag of a step response corresponding to the change from P1 to P2. Further, $V_{a(T)}=V_c1+(V_c2-V_c1)\times e^{-T/td}$ is satisfied, where "td" denotes a time constant (for falling) of a first-order lag of the step response corresponding to the change from P2 to P1. The time constant tr is approximately equal to $Tr^{63}$, and the time constant td is approximately equal to $Td^{63}$.

Figure 1C:
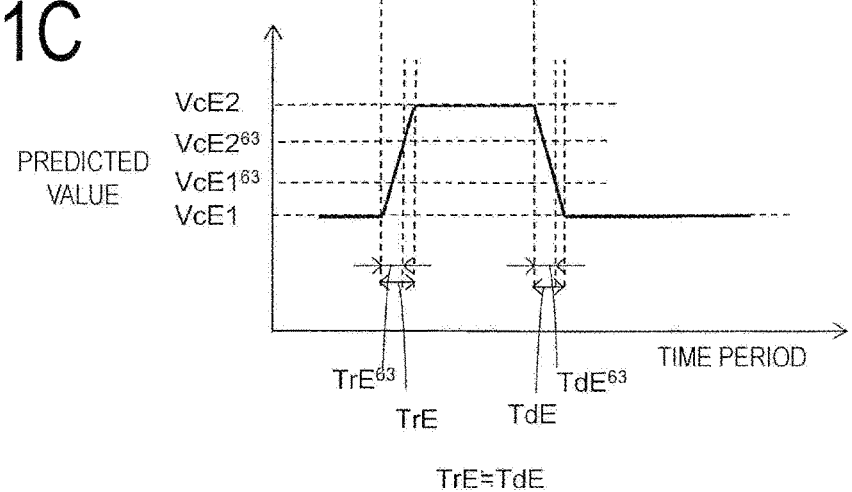

As illustrated in FIG. 1C, a prediction circuit provided in the signal processing device according to an embodiment of the present invention generates, in accordance with a value $V_{a\_T1}$ of an output signal obtained at a time T1, in a transition response period before the response time period Tr or Td elapses, a predicted value $V_{b\_T2}$ corresponding to a value of an output signal to be obtained at a time T2 after the time T1. The prediction circuit generates predicted values $V_cE2$, $V_cE1$ so that $TrE<Tr$, $TdE<Td$, $|1-Td/Tr|>|1-TdE/TrE|$ are satisfied, where TrE denotes a response time period during which the predicted value becomes a value $V_cE2$ corresponding to the second converged value $V_c2$, and TdE denotes a response time period during which the predicted value becomes a value $V_cE1$ corresponding to the first converged value $V_c1$. That is, the prediction circuit generates the predicted value so that a ratio (TdE/TrE) of a response time period based on the predicted value, rather than a ratio (Td/Tr) of a response time period of a sensor, is closer to one.

Therefore, when the response time period of the output signal $V_{a(T)}$ of a sensor differs at the rising and at the falling (Tr≠Td. Here, a case where Td>Tr is illustrated as a typical example), the time periods (TrE, TdE) during which the two predicted values ($V_cE2$, $V_cE1$) are generated, each of which is shorter than the response time periods (Tr, Td) of a sensor and |TdE−TrE|, is smaller than |Td−Tr|. Therefore, it is possible to obtain the predicted value (and the corresponding parameter) in a time period shorter than the response time period of a sensor, and the time period during which the predicted value (and the corresponding parameter) is obtained has a small difference between whether a change in value of the parameter of the property of the object to be measured causes the rising response of the output signal of a sensor or causes the falling response. Naturally, it is preferable that |1−TdE/TrE| is closer to zero, and being zero is most preferable. Note that here, a case where Td>Tr is described; however, the same applies to a case where Tr>Td. A specific example of a method of generating a predicted value to satisfy such a relationship will be described, below.

For example, Japanese Unexamined Patent Application Publication No. 2005-216202A discloses a technique of outputting a future value of time series data. Specifically, first time series data are associated with second time series data subsequent in timing to the first time series data. The time series data at a certain timing is to be predicted, and the second time series data associated with the first time series data corresponding to a specified learning pattern is determined as the future value. When the response time period differs at the rising and at the falling as in an embodiment of the present invention, the use of a learning pattern corresponding to each of the rising and the falling enables output of data in which the response time period of each of the rising and the falling is shortened.

When the response time characteristic of the output signal of a sensor is a step response characteristic of first order lag, the 63% response time period may be used to configure a prediction circuit so as to generate predicted values $V_cE2^{63}$, $V_cE1^{63}$ so that $TrE^{63}<Tr^{63}$, $TdE^{63}<Td^{63}$, $|1-Td^{63}/Tr^{63}|>|1-TdE^{63}/TrE^{63}|$ are satisfied, or instead of the 63% response time period, a 90% response time period may be used to configure a prediction circuit so as to generate predicted values $V_cE2^{90}$, $V_cE1^{90}$ so that $TrE^{90}<Tr^{90}$, $TdE^{90}<Td^{90}$, $|1-Td^{90}/Tr^{90}|>|1-TdE^{90}/TrE^{90}|$ are satisfied.

Note that the prediction circuit provided in the signal processing device according to an embodiment generates, when a value of the property of the object to be measured does not change in time, a predicted value corresponding to the parameter representing each property. For example, when the parameter of the property is the first value P1 and constant, a first predicted value corresponding to the first value P1 is generated, and when the parameter of the property is the second value P2 and constant, a second predicted value corresponding to the second value P2 is generated. The first predicted value has a value close to the converged value $V_c1$, and the second predicted value has a value close to the converged value $V_c2$.

When the signal processing device according to an embodiment of the present invention is used, it is possible to easily carry out processes where a predicted value is used which is based on an output signal from a sensor with differing rising response time period and falling response time period.

Note that there may be various types of configurations for generating, in accordance with a value $V_{1\_T1}$ of the output signal obtained by the prediction circuit at a time T1, a predicted value $V_{b\_T2}$ corresponding to the value of the output signal to be obtained at a time T2 after the time T1. For example, a certain fixed computing equation may be used, or a neural network, a genetic algorithm, PID control, and the like may also be used. A specific example of the prediction circuit will be described later.

Here, a specific example of prediction where PID control is used will be described. For example, Japanese Unexamined Patent Application Publication No. 2001-041824A discloses a method of shortening a response time period of a sensor by a PID controller having control parameters P, I, and D. Each of the control parameters P, I, and D is used as a function of a time constant. When the response time period differs at the rising and at the falling as in an embodiment of the present invention, the use of control parameters corresponding to each of the rising and the falling enable shortening of the response time period of each of the rising and the falling.

As an example, a signal processing device will be illustrated below, which is used for evaluating, on the basis of the output signal from a humidity sensor, a parameter P indicating a humidity, and a signal processing device according to an embodiment of the present invention and a signal processing method executed thereby will be described. Further, a computer program according to an embodiment of the present invention is capable of causing a computer to execute the above signal processing method. Note that an embodiment of the present invention is not limited to the embodiment illustrated.

First Embodiment

Figure 2:
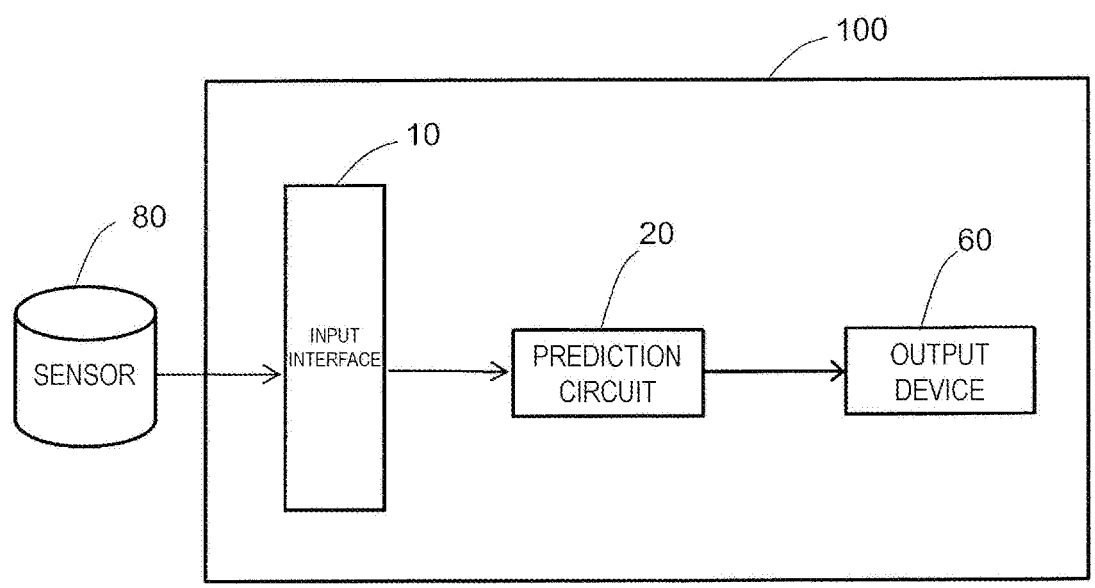
FIG. 2 is a diagram schematically illustrating a configuration of a signal processing device 100 according to a first embodiment of the present invention.

FIG. 2 schematically illustrates a configuration of a signal processing device 100 according to a first embodiment of the present invention. Note that a component having the similar function in the following drawings is allotted with a common reference symbol, and a description may be omitted.

The signal processing device 100 includes: an input interface 10 configured to receive an output signal $V_{a(T)}$ from a sensor 80; and a prediction circuit 20 configured to generate, in accordance with a value $V_{a\_T1}$ of an output signal obtained at a time T1, in a transition response period before a response time period Tr or Td elapses, a predicted value $V_{b\_T2}$ corresponding to a value of an output signal to be obtained at a time T2 after the time T1, where Tr denotes a response time period during which the value of the output signal $V_{a(T)}$ changes from a first converged value $V_c1$ corresponding to a first value P1 (first humidity) of a parameter representing a certain property of an object to be measured to a second converged value $V_c2$ corresponding to a second value P2 (second humidity) different from the first value P1 of a parameter representing the certain property of the object to be measured, and Td denotes a response time period during which the value of the output signal $V_{a(T)}$ changes from the second converged value $V_c2$ to the first converged value $V_c1$. Here, the prediction circuit 20 generates the predicted value so that TrE<Tr, TdE<Td, |1−Td/Tr|>|1−TdE/TrE| are satisfied, where TrE denotes a response time period during which the predicted value becomes a value corresponding to the second converged value $V_c2$, and TdE denotes a response time period during which the predicted value becomes a value corresponding to the first converged value $V_c1$. The signal processing device 100 further includes an optionally provided output device 60. The output device 60 is a display device, for example, and displays a predicted value output from the prediction circuit 20. Note that the prediction circuit 20 may not only output the predicted value as is, but may also convert the predicted value into a value of a parameter and output the parameter value. For example, when output from a sensor and a predicted value thereof is a voltage value, rather than outputting the voltage value, a value of a humidity may be output. Such a conversion may be performed by an arithmetic operation or may be performed using a lookup table. Further, such a conversion may be performed in the prediction circuit 20 or may be performed in the output device 60.

Note that the signal processing device 100 is illustrated as a device independent of the sensor 80; however, the signal processing device 100 may include the sensor 80. Similarly, a signal processing device according to an embodiment below may include the sensor.

Figure 3:
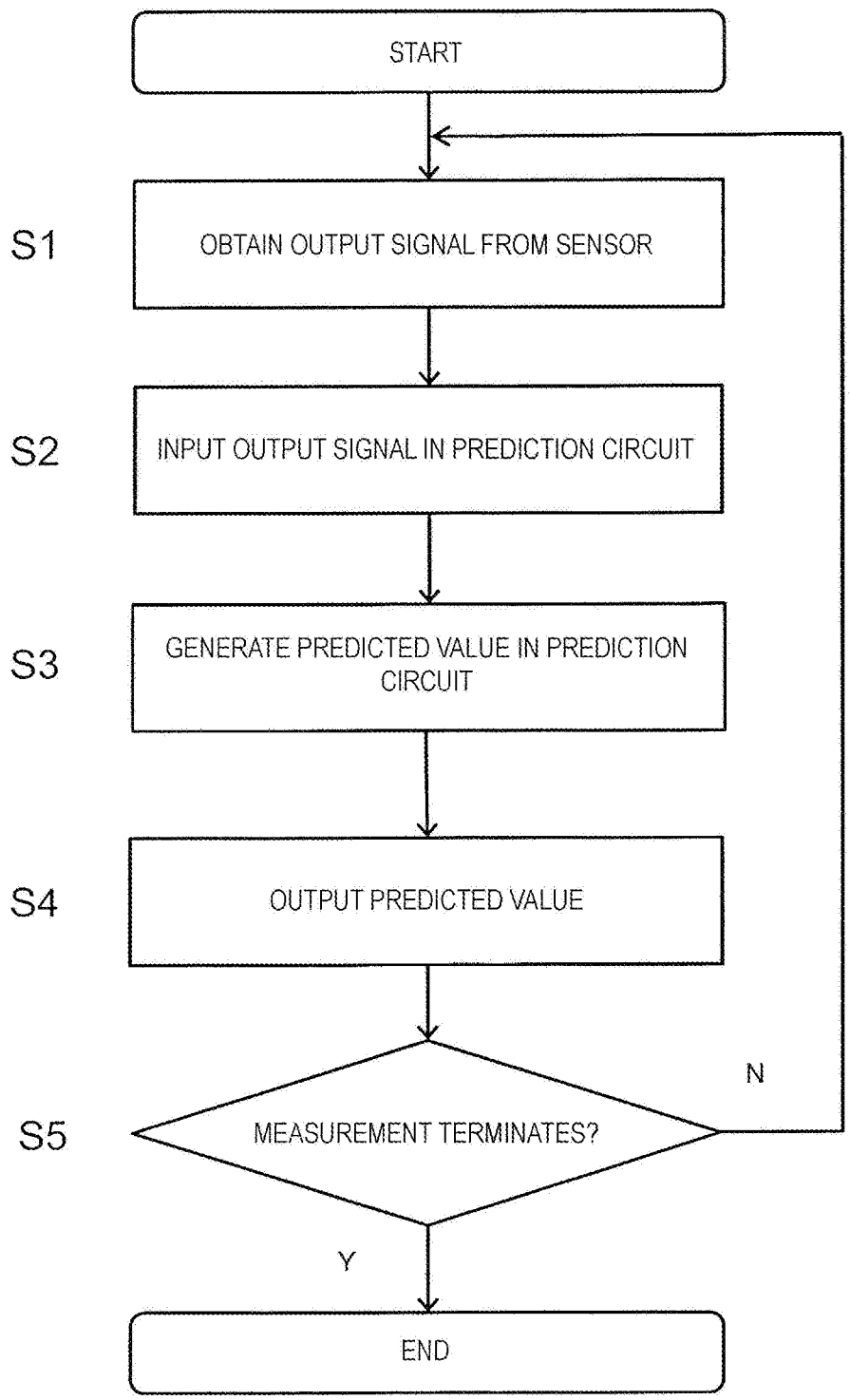
FIG. 3 is a flowchart illustrating the signal processing method according to the first embodiment.

The signal processing device 100 according to the first embodiment is capable of executing a signal processing method illustrated in a flowchart illustrated in FIG. 3.

Firstly, an output signal $V_{a(T)}$ from the sensor 80 is obtained by the input interface 10 (S1).

The input interface 10 outputs the output signal $V_{a(T)}$ to the prediction circuit 20 (S2).

The prediction circuit 20 generates the above-described predicted value (S3).

The prediction circuit 20 outputs the predicted value to the output device 60, and the output device 60 outputs (displays, for example) the predicted value to outside (S4). At this time, instead of the predicted value, a parameter corresponding to the predicted value may be output.

Next, it is determined whether or not the measurement terminates (S5). For example, it is determined whether or not the predicted value is converged. When it is determined that the predicted value is not converged, the process returns to the above step S1, and when it is determined that the predicted value is converged, the measurement terminates. After the termination of the measurement, the predicted value corresponding to the converged value may be continuously displayed. Alternatively, after the response time period elapses, a value of the output signal $V_{a(T)}$, rather than the predicted value, may be displayed. Naturally, the value which is obtained by converting these into a value of a parameter may be displayed.

Second Embodiment

Figure 4:
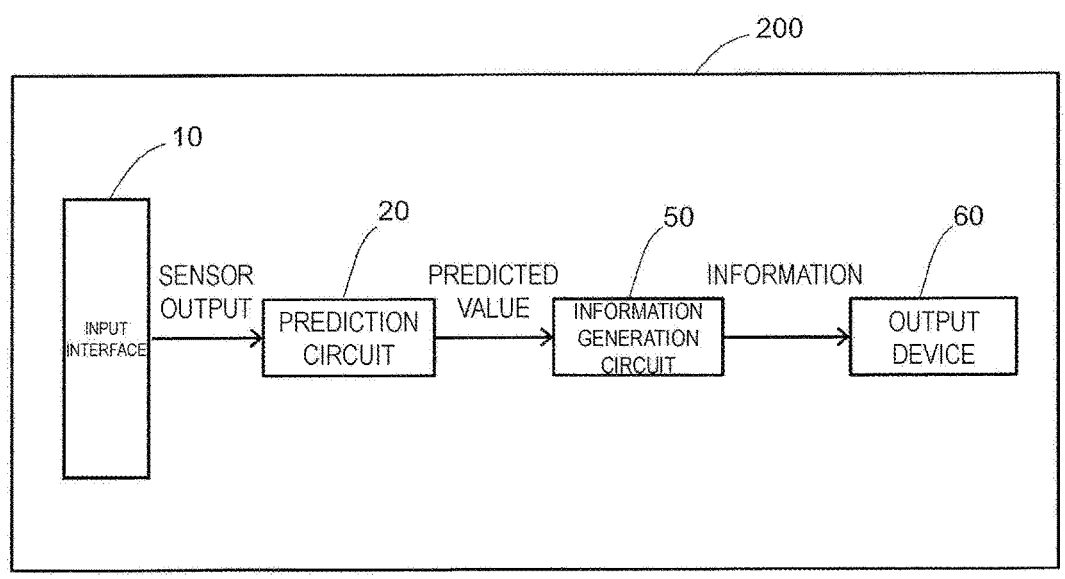
FIG. 4 is a diagram schematically illustrating a configuration of a signal processing device 200 according to a second embodiment of the present invention.

FIG. 4 schematically illustrates a configuration of a signal processing device 200 according to a second embodiment of the present invention. The signal processing device 200, which is different from the previous signal processing device 100, further includes an information generation circuit 50.

The signal processing device 200 includes an input interface 10 configured to receive an output signal $V_{a(T)}$ from the sensor (not illustrated), and a prediction circuit 20. The prediction circuit 20 operates in much the same way as the prediction circuit 20 provided in the signal processing device 100 according to the first embodiment. The prediction circuit 20 outputs a generated predicted value to the information generation circuit 50.

The information generation circuit 50 generates information on the basis of the input predicted value. Here, "information" is information changing according to the predicted value, and may be referred to as "secondary information". For example, when the predicted value is a value for specifying a humidity, the information may be a comfort index, warning information on hyperthermia or influenza, and the like. The information changing according to the value of a humidity may not only be dependent on the value of the humidity but may also be dependent, at the same time, on a temperature (air temperature). It is possible to use a temperature sensor as the sensor 80, and it is thus possible to apply the signal processing device 200 according to the second embodiment to the output signal of a temperature sensor.

The information generation circuit 50 outputs generates information to the output device 60. The output device 60 is a display device, for example, and displays the information output from the information generation circuit 50. The output device 60 may further process the information to be displayed.

Figure 5:
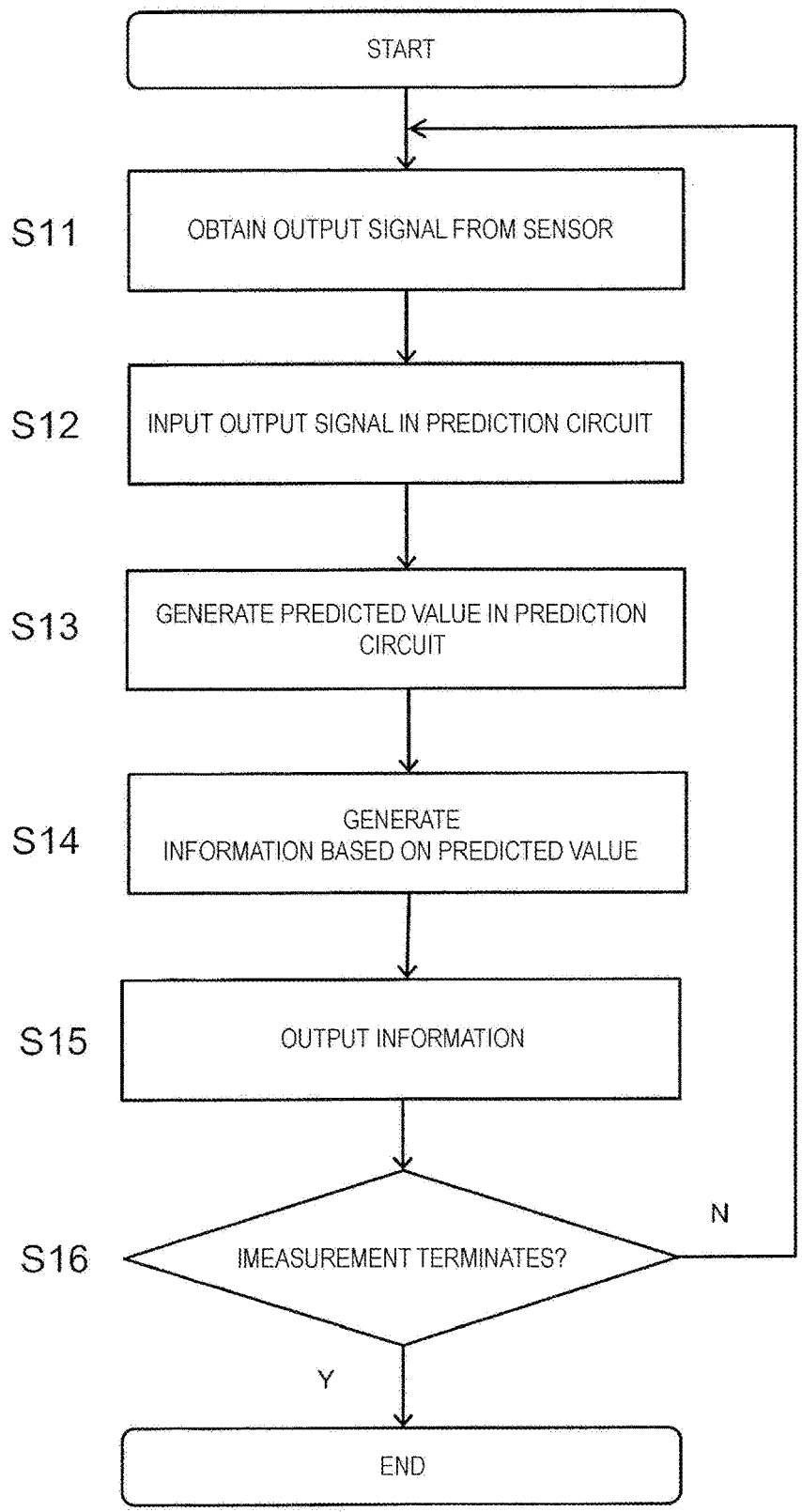
FIG. 5 is a flowchart illustrating the signal processing method according to the second embodiment.

The signal processing device 200 according to the second embodiment is capable of executing a signal processing method illustrated in a flowchart illustrated in FIG. 5.

Firstly, an output signal $V_{a(T)}$ from the sensor 80 is obtained by the input interface 10 (S11).

The input interface 10 outputs the output signal $V_{a(T)}$ to the prediction circuit 20 (S12).

The prediction circuit 20 generates the above-described predicted value and outputs the predicted value to the information generation circuit 50 (S13).

The information generation circuit 50 generates information on the basis of the predicted value, and outputs the same to the output device 60 (S14).

The output device 60 outputs (displays, for example) the information to outside (S15). At this time, the information may be further processed and output.

Next, it is determined whether or not the measurement terminates (S16). For example, it is determined whether or not the predicted value is converged. When it is determined that the predicted value is not converged, the process returns to the above step S11, and when it is determined that the predicted value is converged, the measurement terminates. After the termination of the measurement, the information corresponding to the converged value may be continuously displayed.

Figure 6:
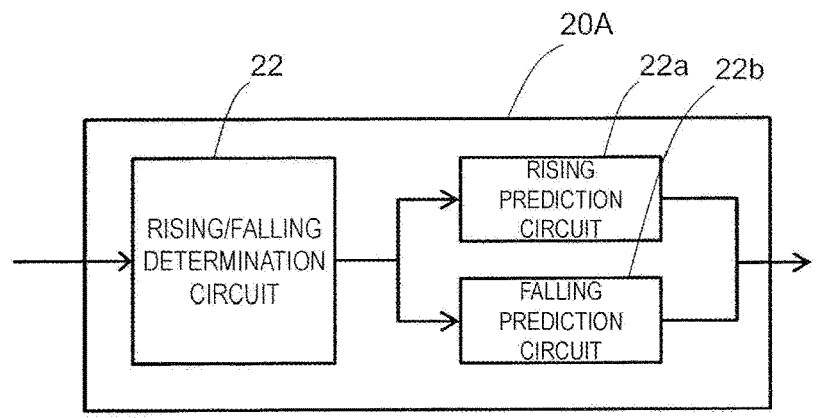
FIG. 6 is a diagram schematically illustrating a configuration of a prediction circuit 20A used as a prediction circuit 20.
Figure 7:
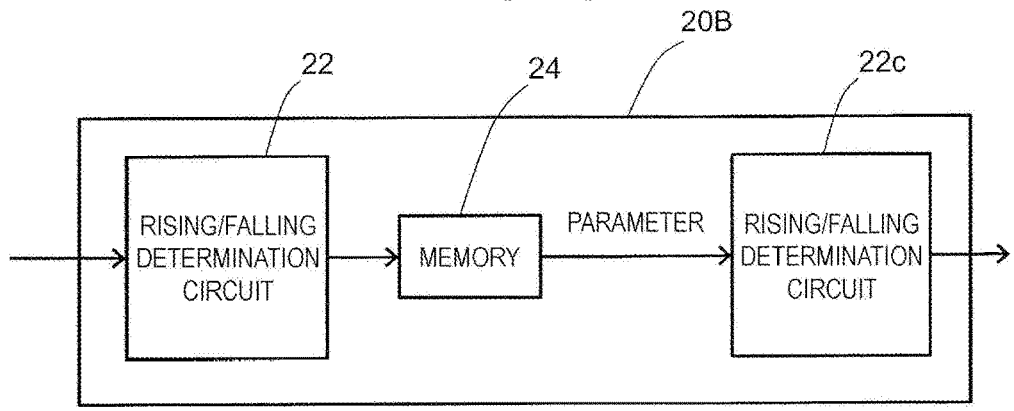
FIG. 7 is a diagram schematically illustrating a configuration of a prediction circuit 20B used as the prediction circuit 20.

With reference to FIG. 6 and FIG. 7, a specific example of the prediction circuit 20 provided in the above-described signal processing devices 100 and 200 will be described.

The prediction circuit 20 illustrated in FIG. 6 may be implemented by a processor or a semiconductor integrated circuit, for example. Examples of the semiconductor integrated circuit include ASIC (Application Specific Integrated Circuit) and FPGA (Field Programmable Gate Array). In a memory, a computer program is stored which is configured to execute a function of each component in the prediction circuit 20, and when a processor in the semiconductor integrated circuit sequentially executes the computer program, the function of each of the components may be implemented.

A prediction circuit 20A illustrated in FIG. 6 includes a rising/falling determination circuit 22, a rising prediction circuit 22a, and a falling prediction circuit 22b. The rising/falling determination circuit 22 receives the output signal $V_{a(T)}$ of a sensor to determine whether a time change of the output signal $V_{a(T)}$ is either the rising or the falling, and in accordance with the determination result, outputs the output signal $V_{a(T)}$ to either the rising prediction circuit 22a or the falling prediction circuit 22b. The rising prediction circuit 22a and the falling prediction circuit 22b generate, in accordance with the respective response characteristics, the predicted value.

The prediction circuit 20A is capable of generating the predicted value in accordance with the rising or the falling of the output signal $V_{a(T)}$, and thus, even when a rising response time period Tr and a falling response time period Td differ, it is possible to generate highly accurately the respective predicted values TrE and TdE independently. Further, the prediction circuit 20A is capable of generating the predicted values TrE and TdE so that TrE<Tr, TdE<Td, |1−Td/Tr|>|1−TdE/TrE| are satisfied.

A prediction circuit 20B illustrated in FIG. 7 includes the rising/falling determination circuit 22, a memory 24, and a rising/falling prediction circuit 22c.

The rising/falling determination circuit 22 receives the output signal $V_{a(T)}$ of a sensor to determine whether or not the time change of the output signal $V_{a(T)}$ is either the rising or falling. The memory 24 stores a parameter used for prediction when the response is the rising and a parameter used for prediction when the response is the falling. In accordance with a determination result of the rising/falling determination circuit 22, the parameter in accordance with each of the responses is supplied from the memory 24 to the rising/falling prediction circuit 22c.

The prediction circuit 20B also is capable of generating, in much the same way as in the prediction circuit 20A, the predicted value in accordance with the rising or the falling of the output signal $V_{a(T)}$, and thus, even when the rising response time period Tr and the falling response time period Td differ, it is possible to generate highly accurately the respective predicted values Tr and Td independently. Further, the prediction circuit 20A is capable of generating the predicted values TrE and TdE so that TrE<Tr, TdE<Td, |1−Td/Tr|>|1−TdE/TrE| are satisfied.

The signal processing devices 100 and 200 according to the first and second embodiments may be a computer controlled to execute, by a computer program, the above-described signal processing method. The computer may be a mobile terminal device such as a smartphone, for example. The mobile terminal device may include a sensor. Further, examples of the computer may include a terminal such as a tablet, a smart watch (wrist watch-type device capable of being attached to an arm with a function of an arithmetic operation and communication in addition to a watch), and a wearable device, and the terminal may include a sensor.

A signal processing device according to third to sixth embodiments below includes a server device connected via a network and a client terminal. The client terminal is a computer having a communication circuit, for example, and examples thereof may include a smartphone, a tablet, a smart watch, and a wearable device. Further, the client terminal may include a sensor.

Third Embodiment

Figure 8:
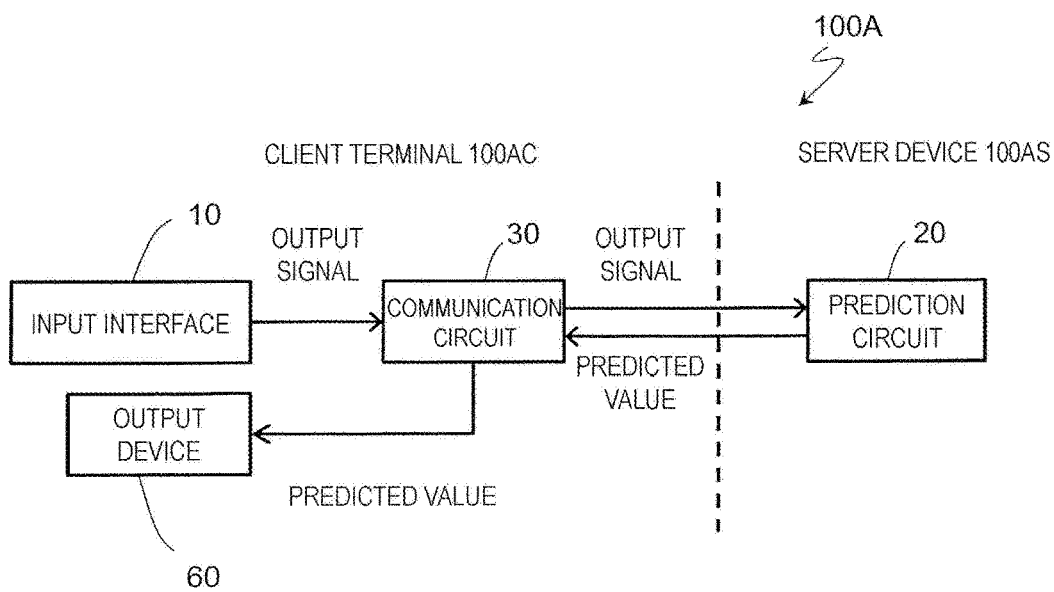
FIG. 8 is a diagram schematically illustrating a configuration of a signal processing device 100A according to a third embodiment of the present invention.

FIG. 8 schematically illustrates a configuration of a signal processing device 100A according to the third embodiment of the present invention.

The signal processing device 100A includes a client terminal 100AC and a server device 100AS. The client terminal 100AC further includes, in addition to the input interface 10 and the output device 60, a communication circuit 30, and may be connected via a network (the Internet, for example) with the server device 100AS. The server device 100AS includes the prediction circuit 20, and the client terminal 100AC exchanges the output signal $V_{a(T)}$ and the predicted value, via the communication circuit 30, with the prediction circuit 20 of the server device 100AS. The signal processing device 100A is capable of operating in much the same way as the signal processing device 100 of the first embodiment.

Fourth to Sixth Embodiments

The signal processing devices 200A to 200C according to the fourth to sixth embodiments are capable of operating in much the same way as the signal processing device 200 of the second embodiment.

Figure 9:
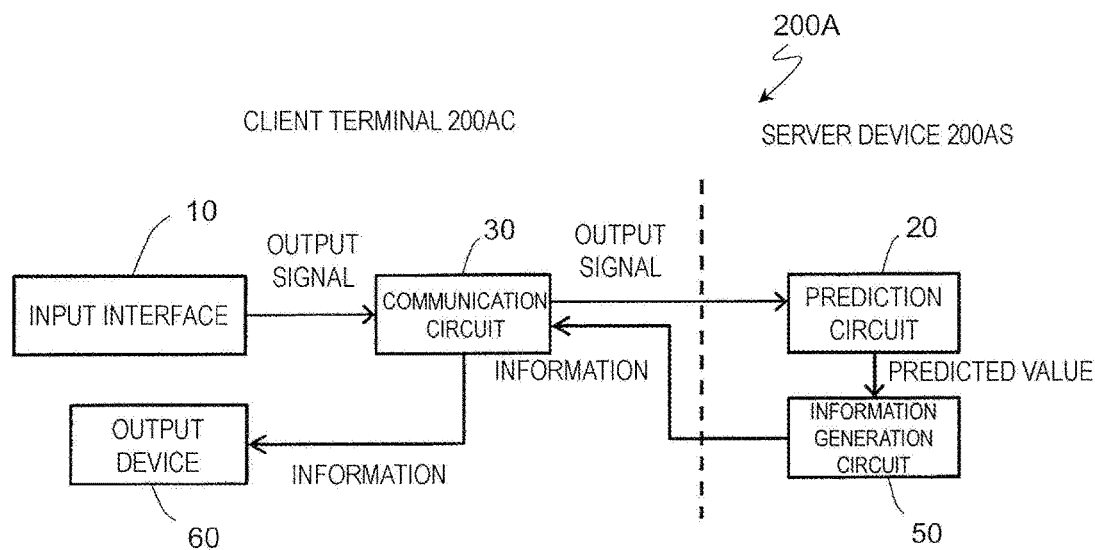
FIG. 9 is a diagram schematically illustrating a configuration of a signal processing device 200A according to a fourth embodiment of the present invention.

FIG. 9 schematically illustrates a configuration of the signal processing device 200A according to the fourth embodiment of the present invention.

The signal processing device 200A includes a client terminal 200AC and a server device 200AS. The client terminal 200AC further includes, in addition to the input interface 10 and the output device 60, a communication circuit 30, and may be connected via a network (the Internet, for example) with the server device 200AS. The server device 200AS includes the prediction circuit 20 and the information generation circuit 50, and the client terminal 200AC exchanges the output signal $V_{a(T)}$ and the information, via the communication circuit 30, with the prediction circuit 20 and the information generation circuit 50 of the server device 200AS.

Figure 10:
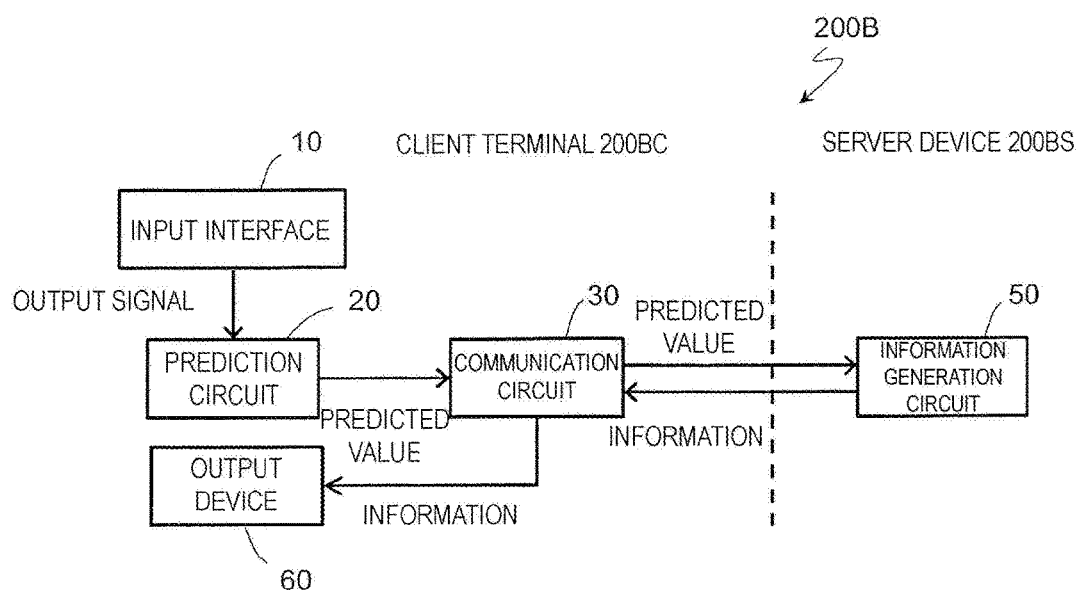
FIG. 10 is a diagram schematically illustrating a configuration of a signal processing device 200B according to a fifth embodiment of the present invention.

FIG. 10 schematically illustrates a configuration of a signal processing device 200B according to the fifth embodiment of the present invention.

The signal processing device 200B includes a client terminal 200BC and a server device 200BS. The client terminal 200BC further includes, in addition to the input interface 10, the prediction circuit 20, and the output device 60, the communication circuit 30, and may be connected via a network (the Internet, for example) with the server device 200BS. The server device 200BS includes the information generation circuit 50, and the client terminal 200BC exchanges the predicted value and the information, via the communication circuit 30, with the information generation circuit 50 of the server device 200BS.

Figure 11:
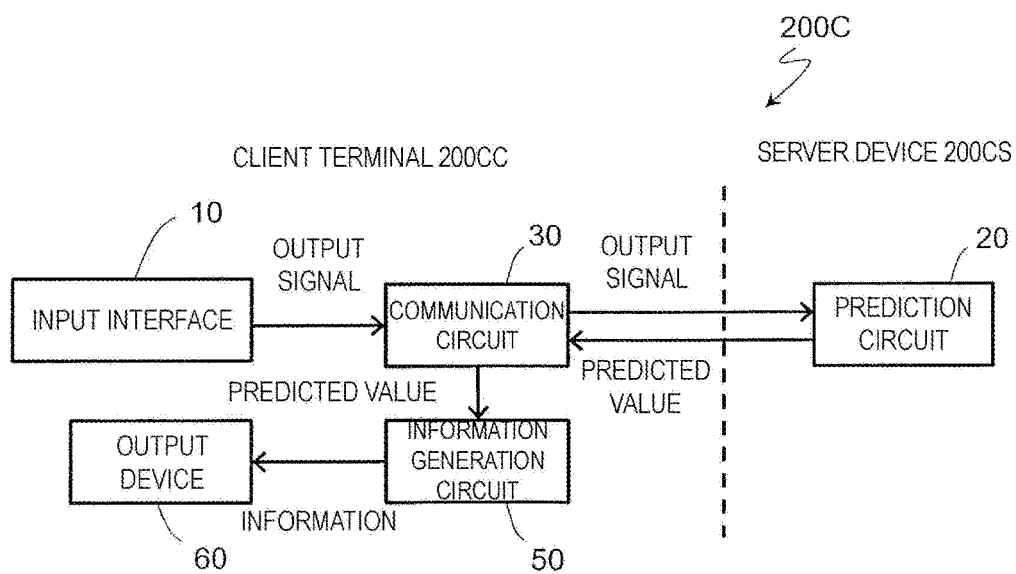
FIG. 11 is a diagram schematically illustrating a configuration of a signal processing device 200C according to a sixth embodiment of the present invention.

FIG. 11 schematically illustrates a configuration of a signal processing device 200C according to the sixth embodiment of the present invention.

The signal processing device 200C includes a client terminal 200CC and a server device 200CS. The client terminal 200CC further includes, in addition to the input interface 10, the information generation circuit 50, and the output device 60, the communication circuit 30, and may be connected via a network (the Internet, for example) with the server device 200CS. The server device 200CS includes the prediction circuit 20, and the client terminal 200CC exchanges the output signal $V_{a(T)}$ and the predicted value, via the communication circuit 30, with the prediction circuit 20 of the server device 200CS.

According to the above-described embodiments, it is possible to assign an arithmetic operation to the client terminal and the server device in accordance with a load and a processing time of the arithmetic operation performed in the prediction circuit or the information generation circuit, and thus, it is possible to optimize a whole processing time including a processing time for communication. As a result, it is possible to shorten a time waited by a user for information to be output.

Note that it is possible to connect the signal processing device according to the first to sixth embodiments and the sensor 80 via a network.

In the above-described embodiments, a case is illustrated where the property of the object to be measured is a humidity; however, this is not limited, and a temperature, a barometric pressure, a gas concentration, and the like may be the property of the object to be measured. When the property of the object to be measured is such environmental information, and when a user moves from indoor to outdoor or takes out a client terminal with sensors from a bag or a pocket as a result of which a value of the property of the object to be measured is suddenly changed, if a signal processing device according to an embodiment of the present invention is used, then even when a power is turned on to quickly start the measurement, in either a case of the rising response or the falling response of the change of the measurement value, it is possible to promptly know environmental information such as a changed humidity, temperature, and barometric pressure without a need of waiting for the response time period to pass.

Further, in the signal processing device according to an embodiment of the present invention, it is possible to use a smell of a food (that is, concentration of a chemical substance in the air around the food) as a property of an object to be measured, and it is possible to use a maturity degree of a food (that is, good timing for eating) as a parameter representing the property, for example.

At this time, even when the change of the measurement value of the smell of the food is either the rising response or the falling response, a user is capable of promptly knowing the maturity degree or the good timing for eating without a need of waiting for an elapse of the response time period. Therefore, for example, when the signal processing device according to an embodiment of the present invention is used in a supermarket or the like, it is possible to select and purchase a food material ready to be eaten.

Further, when the signal processing device according to an embodiment of the present invention is used in a farm and a fruit sorting place to estimate the maturity degree or the good timing of eating, it is possible to determine a date and a time to gather and ship the fruit, to select a shipping location (such as near or far), and to determine a freshness date and a quality guaranteed period.

Further, the signal processing device according to an embodiment of the present invention may be integrated into a cooking device such as a microwave oven. In this case, when the output signal of a sensor configured to detect a vapor output from a food material is used, it is also possible to estimate a cooking situation of the food material.

As a result, even when the change of the measurement value is either the rising response or the falling response, it is possible to know a cooking situation of a food material in the transition response period without a need of waiting for the response time period to elapse, and thus, it is possible to prevent a cooking failure such as overheating and overcooking to ensure an appropriate cooking time period.

Further, the signal processing device according to an embodiment of the present invention may be integrated into an air conditioner such as an air conditioner, a dehumidifier, a humidifier, and an air purifier. In this case, the output signal of a sensor configured to detect a temperature, a humidity, a smell, a soil or the like of a surrounding environment is used to estimate a situation of the surrounding environment.

As a result, even when the change of the measurement value is either the rising response or the falling response, it is possible to know a temperature, a humidity, a smell, and a soil of a surrounding environment in the transition response period without a need of waiting for a response time period to elapse and thus, it is possible to promptly start control of an air conditioning and air purification and the like. As a result, it is possible to promptly provide a user with a comfortable environment.

Further, the property of the object to be measured may be bio-information such as a body temperature of a human or an animal and perspiration. In this case also, even when the change of the measurement value is either the rising response or the falling response, it is possible to promptly know the bio-information such as a changed body temperature and perspiration without a need of waiting for an elapse of the response time period.

The present specification discloses a signal processing device, a signal processing method, and a computer program according to the following items.

Item 1

A signal processing device, comprising: an input interface configured to receive an output signal $V_{a(T)}$ from a sensor; and a prediction unit configured to generate, in accordance with a value $V_{a\_T1}$ of an output signal obtained at a time T1, in a transition response period before a response time period Tr or Td elapses, a predicted value $V_{b\_T2}$ corresponding to a value of an output signal to be obtained at a time T2 after the time T1, where Tr denotes a response time period during which the value of the output signal $V_{a(T)}$ changes from a first converged value $V_c1$ corresponding to a first value P1 of a parameter representing a certain property of an object to be measured to a second converged value $V_c2$ corresponding to a second value P2 different from the first value P1 of a parameter representing the certain property of the object to be measured, and Td denotes a response time period during which the value of the output signal $V_{a(T)}$ changes from the second converged value $V_c2$ to the first converged value $V_c1$, wherein the prediction unit generates the predicted value so that TrE<Tr, TdE<Td, |1−Td/Tr|>|1−TdE/TrE| are satisfied, where TrE denotes a response time period during which the predicted value becomes a value corresponding to the second converged value $V_c2$, and TdE denotes a response time period during which the predicted value becomes a value corresponding to the first converged value $V_c1$.

In accordance with the signal processing device according to item 1, it is possible to easily carry out processes where a predicted value is used which is based on an output signal from a sensor with differing rising response time period Tr and falling response time period Td.

Item 2

The signal processing device according to item 1, wherein the prediction unit generates, when a value of the output signal $V_{a(T)}$ is the first converged value $V_c1$ for a time period longer than the response time period Tr or Td, a predicted value closer to the first converged value $V_c1$, and generates, when the value is the second converged value $V_c2$ for a time period longer than the response time period Tr or Td, a predicted value closer to the second converged value $V_c2$.

In accordance with the signal processing device according to item 2, it is possible to generate, when a value of the property of the object to be measured does not change in time, a predicted value corresponding to the parameter representing each property.

Item 3

The signal processing device according to item 1 or 2, wherein the prediction unit includes a prediction unit corresponding to each of a rising and a falling of the output signal $V_{a(T)}$.

In accordance with the signal processing device according to item 3, it is possible to highly accurately generate the respective predicted values independently, even when the rising response time period Tr and the falling response time period Td differ.

Item 4

The signal processing device according to item 1 or 2, wherein the prediction unit includes a memory configured to store therein a parameter respectively corresponding to each of a rising and a falling of the output signal $V_{a(T)}$.

In accordance with the signal processing device according to item 4, it is possible to highly accurately generate the respective predicted values independently, even when the rising response time period Tr and the falling response time period Td differ.

Item 5

The signal processing device according to any one of items 1 to 4, further including a display device configured to display the predicted value.

In accordance with the signal processing device according to item 5, it is possible to display the predicted value to a user, for example.

Item 6

The signal processing device according to any one of items 1 to 5, further comprising: an information generation unit configured to generate information on the basis of the predicted value generated by the prediction unit.

In accordance with the signal processing device according to item 6, it is possible to generate secondary information based on the predicted value.

Item 7

The signal processing device according to item 6, further including: a display device configured to display the information.

In accordance with the signal processing device according to item 7, it is possible to provide the secondary information based on the predicted value to a user, for example.

Item 8

The signal processing device according to any one of items 1 to 7, including: a client terminal and a server device connected to each other via a network, in which the client terminal includes at least the input interface and a communication unit.

In accordance with the signal processing device according to item 8, it is possible to provide a variation of a signal processing device. Further, it is possible to assign an arithmetic operation to the server device and the client terminal in response to a load of the arithmetic operation required during prediction and information generation.

Item 9

The signal processing device according to any one of items 1 to 8, further including the sensor.

In accordance with the signal processing device according to item 9, it is possible to provide a variation of a signal processing device. Further, when a sensor is integrated into a device, it is possible to reduce a whole configuration of the device.

Item 10

A signal processing method, including: receiving an output signal $V_{a(T)}$ from a sensor; and generating, in accordance with a value $V_{a\_T1}$ of an output signal obtained at a time T1, in a transition response period before a response time period Tr or Td elapses, a predicted value $V_{b\_T2}$ corresponding to a value of an output signal to be obtained at a time T2 after the time T1, where Tr denotes a response time period during which the value of the output signal $V_{a(T)}$ changes from a first converged value $V_c1$ corresponding to a first value P1 of a parameter representing a certain property of an object to be measured to a second converged value $V_c2$ corresponding to a second value P2 different from the first value P1 of a parameter representing the certain property of the object to be measured, and Td denotes a response time period during which the value of the output signal $V_{a(T)}$ changes from the second converged value $V_c2$ to the first converged value $V_c1$. The predicted value is generated so that TrE<Tr, TdE<Td, |1−Td/Tr|>|1−TdE/TrE| are satisfied, where TrE denotes a response time period during which the predicted value becomes a value corresponding to the second converged value $V_c2$, and TdE denotes a response time period during which the predicted value becomes a value corresponding to the first converged value $V_c1$.

In accordance with the signal processing method according to item 10, it is possible to easily carry out processes where a predicted value is used which is based on an output signal from a sensor with differing rising response time period Tr and falling response time period Td.

Item 11

A program causing a computer to: receive an output signal $V_{a(T)}$ from a sensor; and generate, in accordance with a value $V_{a\_T1}$ of an output signal obtained at a time T1, in a transition response period before a response time period Tr or Td elapses, a predicted value $V_{b\_T2}$ corresponding to a value of an output signal to be obtained at a time T2 after the time T1, where Tr denotes a response time period during which the value of the output signal $V_{a(T)}$ changes from a first converged value $V_c1$ corresponding to a first value P1 of a parameter representing a certain property of an object to be measured to a second converged value $V_c2$ corresponding to a second value P2 different from the first value P1 of a parameter representing the certain property of the object to be measured, and Td denotes a response time period during which the value of the output signal $V_{a(T)}$ changes from the second converged value $V_c2$ to the first converged value $V_c1$. The predicted value is generated so that TrE<Tr, TdE<Td, |1−Td/Tr|>|1−TdE/TrE| are satisfied, where TrE denotes a response time period during which the predicted value becomes a value corresponding to the second converged value $V_c2$, and TdE denotes a response time period during which the predicted value becomes a value corresponding to the first converged value $V_c1$.

In accordance with the program according to item 11, by using a computer, it is possible to easily carry out processes where a predicted value is used which is based on an output signal from a sensor with differing rising response time period Tr and falling response time period Td.

INDUSTRIAL APPLICABILITY

The present invention may be used for a signal processing device, a signal processing method, and a computer program with which it is possible to evaluate, on the basis of an output signal from a sensor, a predicted value.

REFERENCE SIGNS LIST

10 Input interface
20, 20A, 20B Prediction circuit (prediction unit)
22 Rising/falling determination circuit
22a Rising prediction circuit
22b Falling prediction circuit
22c Rising/falling prediction circuit
24 Memory
30 Communication circuit
50 Information generation circuit
60 Output device
80 Sensor
100, 100A, 200, 200A, 200B, 200C Signal processing device
100AC, 200AC, 200BC, 200CC Client terminal
100AS, 200AS, 200BS, 200CS Server device

The invention claimed is:

1. A signal processing device, comprising:
an input interface configured to receive an output signal $V_{a(T)}$ from a sensor; and
a prediction unit configured to generate, in accordance with a value $V_{a\_T1}$ of an output signal obtained at a time T1, in a transition response period before a response time period Tr or Td elapses, a predicted value $V_{b\_T2}$ corresponding to a value of an output signal to be obtained at a time T2 after the time T1, where Tr denotes a response time period during which the value of the output signal $V_{a(T)}$ changes from a first converged value $V_c1$ corresponding to a first value P1 of a parameter representing a certain property of an object to be measured to a second converged value $V_c2$ corresponding to a second value P2 different from the first value P1 of a parameter representing the certain property of the object to be measured, and Td denotes a response time period during which the value of the output signal $V_{a(T)}$ changes from the second converged value $V_c2$ to the first converged value $V_c1$, wherein
the prediction unit generates the predicted value so that TrE<Tr, TdE<Td, |1−Td/Tr|>|1−TdE/TrE| are satisfied, where TrE denotes a response time period during which the predicted value becomes a value corresponding to the second converged value $V_c2$, and TdE denotes a response time period during which the predicted value becomes a value corresponding to the first converged value $V_c1$.

2. The signal processing device according to claim 1, wherein the prediction unit generates, when a value of the output signal $V_{a(T)}$ is the first converged value $V_c1$ for a time period longer than the response time period Tr or Td, a predicted value closer to the first converged value $V_c1$, and generates, when the value is the second converged value $V_c2$ for a time period longer than the response time period Tr or Td, a predicted value closer to the second converged value $V_c2$.

3. The signal processing device according to claim 1, wherein the prediction unit includes a prediction unit corresponding to each of a rising and a falling of the output signal $V_{a(T)}$.

4. The signal processing device according to claim 1, wherein the prediction unit includes a memory configured to store therein a parameter corresponding to each of a rising and a falling of the output signal $V_{a(T)}$.

5. The signal processing device according to claim 1, further comprising: an information generation unit configured to generate information on the basis of the predicted value generated by the prediction unit.

6. The signal processing device according to claim 5, further comprising: a display device configured to display the information.

7. The signal processing device according to claim 1, comprising: a client terminal and a server device connected to each other via a network, wherein
the client terminal includes at least the input interface and a communication unit.

8. The signal processing device according to claim 1, further comprising the sensor.

9. A signal processing method, comprising:
receiving an output signal $V_{a(T)}$ from a sensor; and
generating, in accordance with a value $V_{a\_T1}$ of an output signal obtained at a time T1, in a transition response period before a response time period Tr or Td elapses, a predicted value $V_{b\_T2}$ corresponding to a value of an output signal to be obtained at a time T2 after the time T1, where Tr denotes a response time period during which the value of the output signal $V_{a(T)}$ changes from a first converged value $V_c1$ corresponding to a first value P1 of a parameter representing a certain property of an object to be measured to a second converged value $V_c2$ corresponding to a second value P2 different from the first value P1 of the parameter representing the certain property of the object to be measured, and Td denotes a response time period during which the value of the output signal $V_{a(T)}$ changes from the second converged value $V_c2$ to the first converged value $V_c1$, the predicted value is generated so that TrE<Tr, TdE<Td, |1−Td/Tr|>|1−TdE/TrE| are satisfied, where TrE denotes a response time period during which the predicted value becomes a value corresponding to the second converged value $V_c2$, and TdE denotes a response time period during which the predicted value becomes a value corresponding to the first converged value $V_c1$.

10. The signal processing device according to claim 2, wherein the prediction unit includes a prediction unit corresponding to each of a rising and a failing of the output signal $V_{a(T)}$.

11. The signal processing device according to claim 2, wherein the prediction unit includes a memory configured to store therein a parameter corresponding to each of a rising and a falling of the output signal $V_{a(T)}$.

* * * * *